US005564196A

United States Patent [19]

Nomura et al.

[11] Patent Number: 5,564,196

[45] Date of Patent: Oct. 15, 1996

[54] ROLL WITH COMPOSITE COATS

[75] Inventors: Hirotoshi Nomura; Keiji Nakayama; Yasushi Kitamura; Hajime Miwa; Tokumi Ikeda, all of Osaka, Japan

[73] Assignee: Nomura Techno Research Kabushiki Kaisha, Osaka, Japan

[21] Appl. No.: 311,491

[22] Filed: Sep. 23, 1994

[30] Foreign Application Priority Data

Sep. 24, 1993 [JP] Japan .................................... 5-238544

[51] Int. Cl.$^{6}$ .............................. F26B 15/00; B32B 5/16; B32B 7/02; B32B 15/00

[52] U.S. Cl. ................................ 34/110; 34/108; 34/118; 428/621; 428/626; 428/667; 428/679; 428/681; 428/161; 428/213; 428/217; 428/323; 428/328; 428/421; 492/47; 492/53; 492/54; 162/273; 162/359.1

[58] Field of Search .................................... 428/621, 624, 428/626, 681, 157, 161, 163, 164, 167, 323, 328, 421, 422, 906, 908.8, 667, 679, 213, 217; 492/36, 39, 40, 49, 53, 54, 56, 59, 47, 20, 26, 27, 47, 30; 162/289, 273, 359.1, 358.2, 315, 318, 374, 396, 901, 291, 358.3, 358.1; 193/37, 35 B; 34/108, 110, 118, 116

[56] References Cited

U.S. PATENT DOCUMENTS

| | | | |
|---|---|---|---|
| 3,796,423 | 3/1974 | Shuster | 270/68 A |
| 3,942,230 | 3/1976 | Nalband | 29/132 |
| 4,505,573 | 3/1985 | Brewington et al. | 355/3 DD |
| 5,023,985 | 6/1991 | Salo et al. | 29/132 |
| 5,283,121 | 2/1994 | Bordner | 428/381 |

FOREIGN PATENT DOCUMENTS

| | | |
|---|---|---|
| 285575A | 2/1928 | United Kingdom . |

*Primary Examiner*—Paul J. Thibodeau
*Assistant Examiner*—Vivian Chen
*Attorney, Agent, or Firm*—Flynn, Thiel, Boutell & Tanis, P.C.

[57] ABSTRACT

A roll used for tensioning a canvas belt used to hold paper against a dryer. The roll includes a main cylindrical body formed of steel. A layer formed of a metal harder than steel is disposed over the outer surface of the main body. The metal layer is formed with a channel around its center so as to define two spaced roll end sections of a common diameter. A fluororesin layer is disposed in the metal layer channel and is shaped so as to have an outer surface of a diameter equal to that of the metal layer end sections.

21 Claims, 5 Drawing Sheets

ROLL WITH COMPOSITE COATS

FIELD OF THE INVENTION

This invention concerns a roll formed from composite material designed for use with a paper dryer.

DESCRIPTION OF THE PRIOR ART

In a paper-making machine (a paper manufacturing process), processed wet paper arrives at a dryer from a wire unit and a press unit with a moisture content of 60 to 65% at the entrance (Point S in FIG. 2) of the dryer. It is the work of the dryer 4 to dry to the wet paper to a moisture content about 5% at the exit (Point E in FIG. 2). As seen from FIG. 2, the upper surface of wet paper 5 is dried with a series of dryers 6 located in the bottom of the dryer room and the bottom surface of the paper 5 is dried with a series of dryers 7 located in the top of the room. In order to increase the drying efficiency, a dryer canvas belt 8 is used to impose a tension T on the paper to hold the wet paper against the dryers 6. Each dryer canvas belt itself is held in place with rolls, i.e., canvas rolls 9*a*, 9*b*, and 9*c* and moves in a circular path as indicated by arrow P. Because rolls 9*a* and 9*c* are in contact with the outer surface of the dryer canvas belt, which is directly in contact with the wet paper, the contaminants on the dryer canvas are transferred and stuck to the rolls. Consequently, these contaminants stick to the processing wet paper again where they contaminate the wet paper.

Canvas rolls have usually been made of steel pipes. For a long time there has been a tendency to increase the speed of the paper-making machines by increasing the number of dryers and the diameter of the dryer drums. This increases not only the vapor pressure of dry air to be passed into the dryer, but also the tension of the canvas belts. Furthermore, the percentage of used paper employed to advancing the recycling of materials of paper-making has increased as a result of the overall heightened interest in recycling. Consequently, sticky alien substances, pitch, from the used paper has increased in quantity relatively so as to cause frequent pitch problems at the dryer.

On the other hand, because the making canvas materials have been improved from cotton to good durable plastics, i.e., synthetic fibers such as polyamides, polyesters, polyacrylates, etc., and the canvas made of the later materials have been more lasting and had toughness than that of one made by cotton, it has become possible to increase the canvas tension over what was previously possible.

One way tried to reduce the pitch problems has been to form canvas rolls from steel pipes that are covered by non-sticky fluororesin (for example, the material sold under the mark Teflon). There have been some difficulties obtaining good results because the relatively soft fluororesin is worn away and the steel pipes are exposed in a period as short as six months to a year. This occurs because the pitch becomes buried in the fluororesin layer and solidifies. The relatively soft fluororesin is rubbed against the stiff canvas belt which is under high tension. Consequently, the fluororesin is rapidly worn off the roll.

From an economical point of view, frequent recoating of the expensive fluororesin to prevent alien substances from sticking to the wet paper raises the cost of producing paper. There is another problem with the fluororesin coating. This coating has a high specific resistance and is rubbed continuously under high speed by the canvas. The canvas is made of the plastic which has the same electrical resistance and produces static electricity which can be charged or discharged between the fluororesin covered canvas rolls and the frame of the machine to which they are attached.

SUMMARY OF THE INVENTION

In view of the history of the development of the canvas roll in the paper-making machine, it is seen that steel rolls have been used over several decades from the early time to this day without changing the materials. Quite recently, though the canvas rolls covered with fluororesin that have desirable non-stick qualities have been employed, however, there are still the above-mentioned problems. This invention substantially eliminates these problems. The invention is a novel canvas roll, which minimizes the pitch problems of past canvas rolls caused by the recent high speed operation during the paper production process, and the increasing use of used paper as raw material. The invention increases the life of the dryer canvas itself, minimizes the production of static electricity, and increases the useful life of the fluororesin coating.

In the roll with composite coat of this invention, both ends of a roll are plated as shown in FIG. 1 by a material that is harder than the basic raw steel that forms the roll main body. The material can be chromium plating, non-electrolytic nickel plating formed by the plating method cermet or an alloy formed by the thermal spray method. The middle of the roll is coated by a plastic such as fluororesin so as to define a uniform outer surface with the ends of the roll. It is recommended that a filler, such as carbon, carbon fiber, carbon plus graphite, carbon fiber plus graphite, carbon plus molybdenum disulfide, carbon fiber plus molybdenum disulfide, be mixed in fluororesin coating. FIG. 1 shows the construction of the roll with composite coat of this invention as an illustration. In this figure, 1 is a roll made of a hollow cylindrical steel pipe and L is the full length of the roll. A circumferential channel 1*a* having a length 2L/4 is formed the middle part of the roll and is made thinner than that of the L/4 section at the ends of the roll. A metal or alloy coat 2 covers the surface of the main body of roll 1. Alloy coat 2 covers pipe channel 1*a* so as to define a circumferential alloy groove 2*a*. A fluororesin coat 3 covers the 2L/4 middle, alloy channel 2*a*, part of the outside of the roll. Moreover, as depicted in FIG. 1, channel 1*a* is formed so as to have outwardly tapered edge surfaces 1*b* which extends toward the adjacent ends of the roll 1. As a result alloy channel 2*a* is formed with like outwardly tapered surfaces 2*b* so that the inner surface of the fluororesin coat 3 that abuts alloy groove has a like upwardly tapered surface 3*b*. The construction of the roll with a composite coat of this invention is not limited to the one illustrated in FIG. 1, and the shape may possibly be changed and still be within the scope of the invention as described by the claims.

DETAILED DESCRIPTION OF THE INVENTION

The inventors of the roll of this invention measured the wear of the roll by observing the state of the canvas roll covered by fluororesin (PFA resin) for 200 μm for 12 months. For a canvas roll of length L, the fluororesin in the L/4 sections extending inward from the ends of the roll was worn away leaving the raw steel pipe in the exposed state. It is understood that the reason of unusual loss is the unsymmetrical pressing of the canvas belt against the roll because there is a high canvas belt tension in this part by examining the relation of unusual loss of canvas and roll.

Further, it was found by examination that the phenomenon of the unsymmetrical pressing of the canvas is a common phenomenon in paper-making machines. When the contamination state of the said canvas roll was investigated, it was found that there were no deposits or sticking of pitch and paper powder on the exposed part of the raw steel and where the fluororesin of the canvas roll was significantly worn. Where there was still some fluororesin on the roll, a number of small pieces of solidified pitch were completely buried in the remaining fluororesin.

At other sections along the roll where canvas tension was not as high, the state of the roll attaching paper powder was observed. Thus, as the undesirable phenomena that the fluororesin on a specific part in the canvas roll is worn unusually or that may solidified pitches are buried into the remaining fluororesin on the roll, should be accelerated by the recent tendency to strengthen the canvas tension, therefore, the extensive investigation on the production of wear-resistant fluororesin and improvement of the surface construction of the roll have been undertaken.

A. Evaluation of Wear Resistance and Non-Contaminating Properties.

Figure 1:
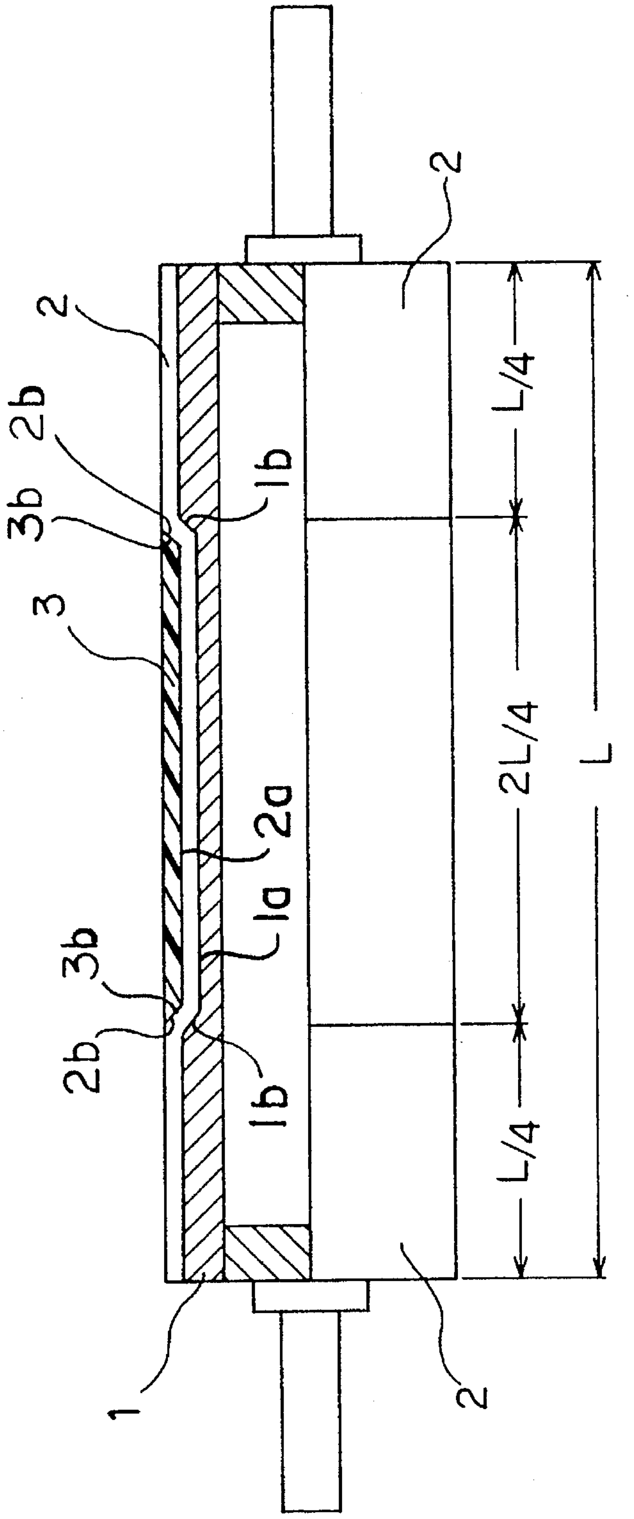
FIG. 1 is a front elevation, partly in section, of the roll of this invention.
Figure 2:
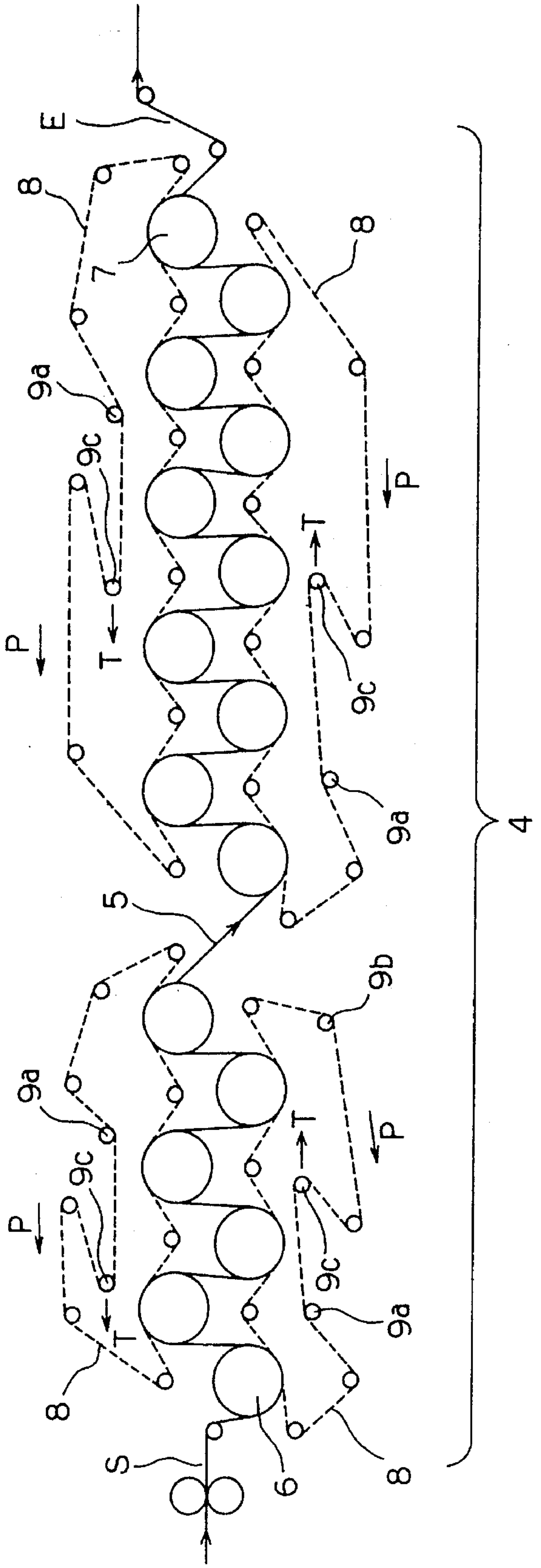
FIG. 2 is an illustration showing the construction of a dryer of the paper-making machine.
Figure 3:
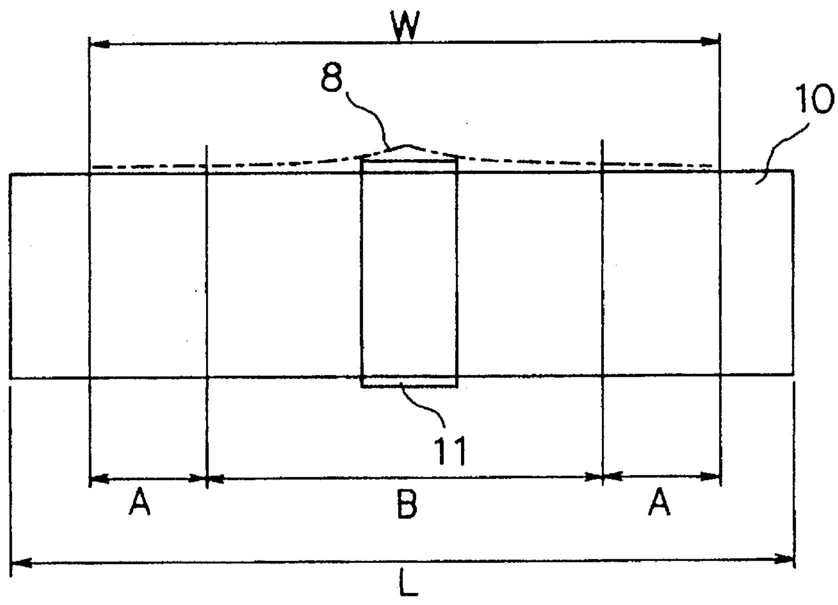
FIG. 3 is an illustration showing the outline of the construction of a test roll for a test to press canvas unsymmetrical.
Figure 4:
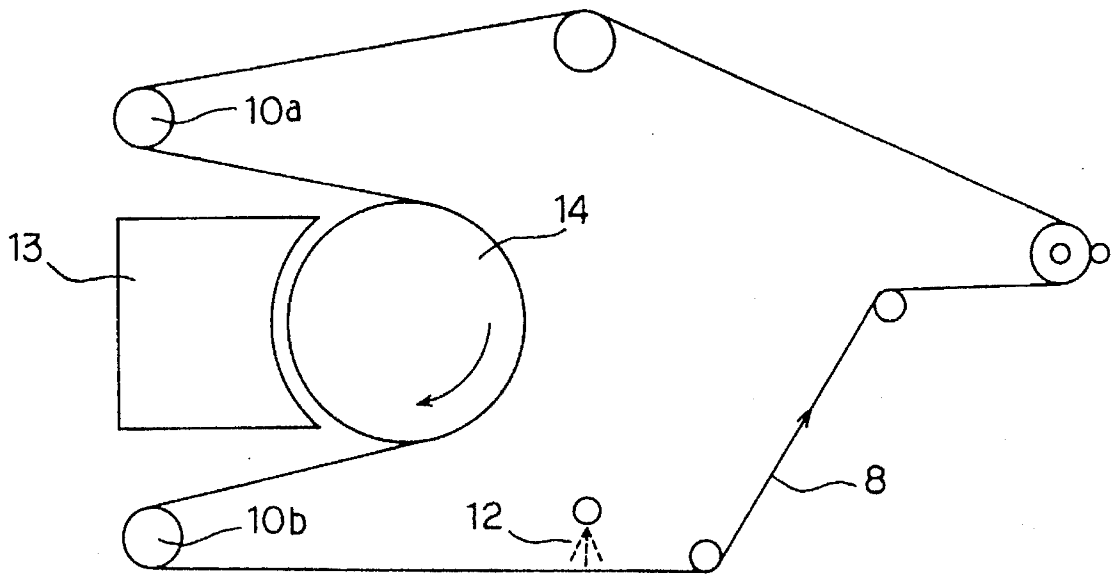
FIG. 4 is an illustration showing the outline of the construction of a contaminant test machine of the canvas roll.

In order to know about the non-contaminant and the wear-resistant properties of the canvas roll, a test roll 10 shown in FIG. 3 was examined after the surfaces of the rolls were coated uniformly with various materials. The middle part of the roll 10 was covered thickly by a tape 11 to artificially asymmetrically press the canvas. Then, the canvas 8 was contaminated artificially. At the same time, an aqueous suspension 12 of chromium oxide, which is used as a polishing material, was sprayed over a part of the canvas as shown in FIG. 4 to accelerate wear of the surface of the canvas roll. The canvas was driven continuously for 120 hours under canvas tension T=1.8 Kg/cm and continuously heated by heater 13. In the figure, a roll 10*a* coated by fluororesin and a roll 10*b* coated by chromium are shown. The test roll used for examination is the non-coated steel pipe, or the steel pipe coated by fluororesin (PFA resin), chromium plating, non-electrolytic nickel plating, chromium carbide etc. The length of the roll was L= 500 mm and the width of the canvas was W= 400 mm. The results of the wear acceleration examination are shown in Table 1 and Table 2. The evaluation of the test roll is divided into the A sections, the outer sections of the test roll of FIG. 3 and the B section, the middle section of the test roll. The rotational speed of the canvas roll 10 was 600 m/min.

TABLE 1

| Suitability | Evaluation of the Outer Sections (A parts) of Canvas Rolls Under Tension: Non-Contaminant Properties | Wear-Resistant Properties |
|---|---|---|
| Most Satisfactory | chromium plating<br>chromium carbide<br>non-electrolytic nickel | chromium plating<br>chromium carbide<br>non-electrolytic nickel |
| Somewhat Satisfactory | fluororesin | steel pipe |
| Least Satisfactory | steel pipe | fluororesin |

TABLE 2

| Suitability | Evaluation of the Middle Section (B Part) of Canvas Tension: Non-Contaminant Properties | Wear-Resistant Properties |
|---|---|---|
| Most Satisfactory | fluororesin | chromium plating<br>chromium carbide<br>non-electrolytic nickel<br>steel pipe |
| Superior Qualities | chromium plating | fluororesin |
| Satisfactory | non-electrolytic nickel<br>chromium carbide | |
| Least Satisfactory | steel pipe | |

The non-contaminant properties of the canvas roll coated by chromium plating, chromium carbide by thermal spray method, and non-electrolytic nickel plating are almost equal at the outer end sections of the roll. Also, these coatings were not significantly contaminated. The roll coated with fluororesin had clearly non-contaminant properties, but some of the polishing material was buried in the fluororesin at the outer ends of the roll. The roll made by steel pipe was significantly contaminated by the polishing material.

With regard to the non-contaminant properties at the middle section of the roll of the coated materials, it was clearly found that it is most superior in the order of fluororesin, then chromium plating, then non-electrolytic nickel plating and chromium carbide and then steel pipe. The chromium-plating, non-electrolytic nickel plating and chromium carbide showed no sign of wear owing to the short testing time. There were, however, some scratches. There was notable wear in the roll made by steel pipe without coating.

On the other hand, it was found that extensive wear developed and was observed significant static electricity was discharged by in the roll covered with fluororesin in a short time. There were no changes other than the static electric discharge and a minor wear observed in fluororesin of any test rolls at the lower part of the canvas tension.

In conclusion, it is necessary to pay attention to the wear-resistant properties rather that the non-contaminant properties at the outer ends of the roll tension, and to pay attention to the high degree of non-contaminant properties rather than the wear-resistance at the middle section of the roll according to the above results.

B. Study to Prevent Production of Static Electricity and Examination of Wear-Resistance Properties.

In order to prevent contamination at the middle of the roll, while some difficulties occur due to unusual wear due to the embedding of the pitch, it was found that fluororesin is a highly suitable coating material for coating the roll. However, it is desirable to improve the fluororesins' wear-resistant properties because there is also more wear due to the rubbing motion of the fluororesin against the canvas belt: at the middle of the roll.

The fluororesin was prepared by adding various fillers into PFA resin which can be painted with electrostatic powder possible, and was limited to use. Then the surface of the steel ring of length 100 mm and diameter 360 mm was coated with the fluororesin added various fillers for a thickness of 150 μm as a target. The wear acceleration experiment of the fluororesin by which giving a tension to the canvas continuously and pressing the surface of the fluororesin-coated ring compulsorily through the canvas was tested.

For this test, the tension on the canvas was not 1.8 Kg/cm, which is the typical tension imposed on the canvas during the paper making process. Instead, during the wear promotion experiment, the canvas was subjected to different tensions. The experiment time was 24 hours for each tension exposure. The results are shown in Table 3. From this test, it is clear that the wear qualities of the fluororesin rubbed against the canvas belt vary according to the filler added. It was found that the fluororesin with the superior wear-resistant effects are the ones with carbon or carbon fiber.

In Table 3, as used for comparison, the wear acceleration experiment of chromium plating, non-electrolytic nickel plating, chromium carbide by thermal method, etc., have been done at the same time, but no wear was observed.

erably longer when compared with the one coated with natural fluororesin. However, it is believed that some wear will occur due to the higher canvas tension that occurs near the ends of the roll, because the fluororesin is an organic material though the filler-soaker fluororesin has a longer life than that of prior fluororesins as wear-acceleration experiments show.

Accordingly, the inventors have decided to rely on the finding that adhesion of pitches does not significantly occur if the ends of canvas roll are relatively hard and are formed of material not prone to contamination such as chromium plating, non-electrolytic nickel plating, metal and cermet thermal spray coat that have the desirable non-contaminant properties.

From the examination of the ends of the roll, the inventors found that the wear-resistance can be improved simultaneously with the prevention of pitch contamination if sections of at least L/4 in length from the ends of the roll of length L are coated with one of the selected metals or alloys so as to form a uniform coplanar surface with the fluororesin covered at the middle part of the roll.

Strictly speaking, it is usually necessary to change the coating range with the metal or alloy depending upon the width of canvas, the kind of the canvas, the canvas tension, and the driving speed of the paper-making machine. It was found that a coating range with a selected metal or alloy fall into within the above setting range on the length L of the canvas roll under any circumstances.

TABLE 3

Fluororesin Coating with Additives Wear Rate

| No. | Fillers | Additional Quantity | Measured Coating Wear At Given Belt Tensions 3.85 Kg/cm | 5.90 Kg/cm | 7.27 Kg/cm |
|---|---|---|---|---|---|
| 1 | No Addendum (natural) | 15 (capacity %) | 10 μm | 36 μm | 75 μm |
| 2 | Silicon Carbide | 15 (capacity %) | 4 μm | 12 μm | 26 μm |
| 3 | Glass Fiber | 15 (capacity %) | 11 μm | 19 μm | 39 μm |
| 4 | Carbon | 15 (capacity %) | 2 μm | 4 μm | 4 μm |
| 5 | Carbon Fiber | 15 (capacity %) | 1 μm | 3 μm | 4 μm |
| 6 | Bronze | 15 (capacity % | 12 μm | 22 μm | 57 μm |
| 7 | Chromium for Comparison (plating) | | 0 μm | 0 μm | 0 μm |
| 8 | Non-Electrolytic Nickel for Comparison (plating) | | 0 μm | 1 μm | 0 μm |
| 9 | Chromium Carbide for Comparison (thermal spray) | | 0 μm | 0 μm | 0 μm |

Figure 5:
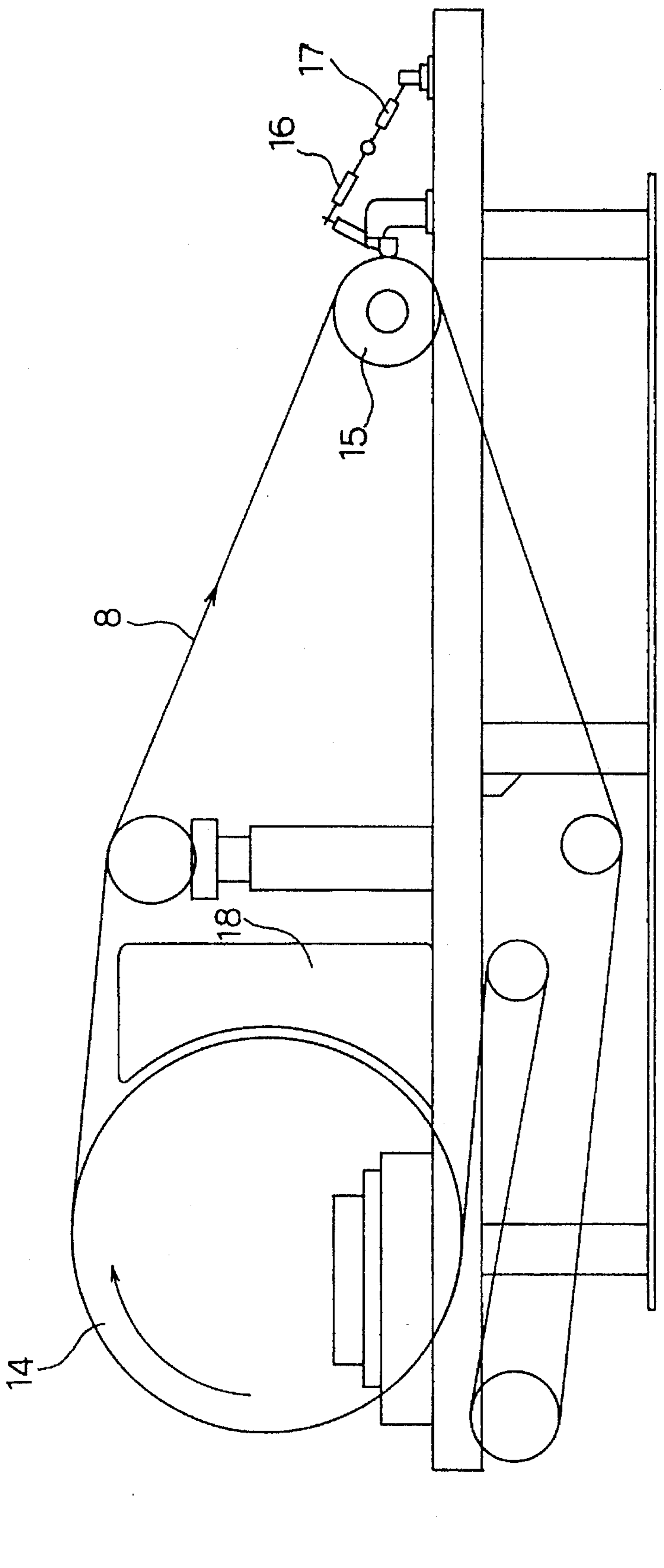
FIG. 5 is a front elevational view showing the whole construction of a wear test machine.
Figure 6:
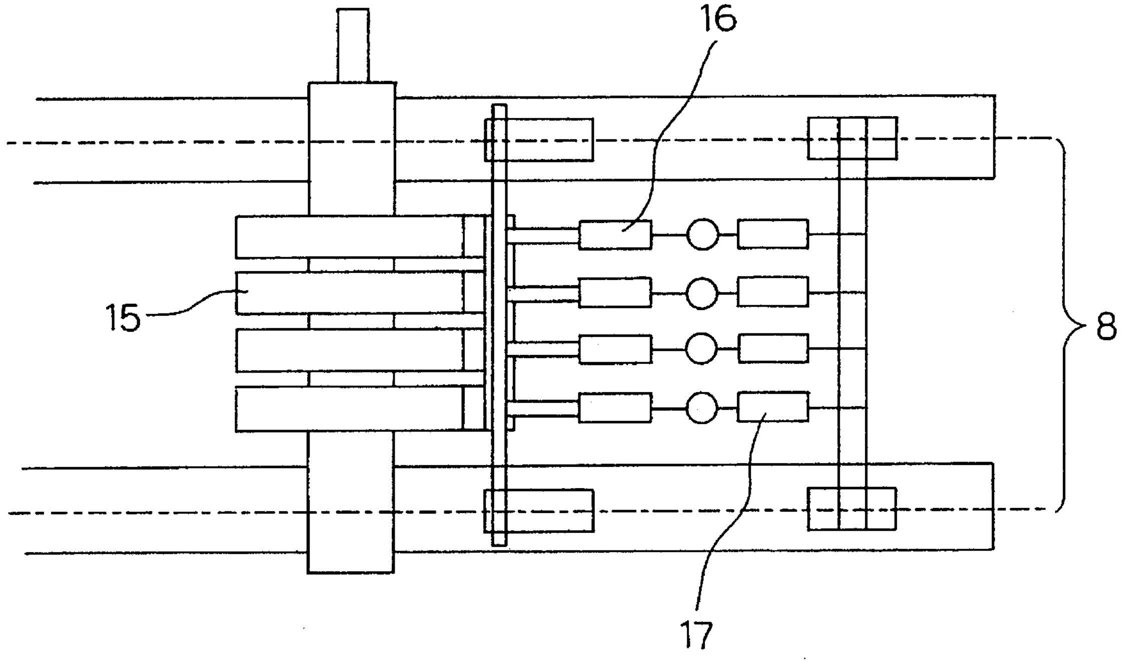
FIG. 6 is a top plan view showing the main construction of a wear test machine.

The wear acceleration experiment test unit is shown in FIG. 5. In this figure, 14 is a fluororesin-coated roll, 8 is a canvas (HBT-806, 400 W×14.1 m made by Shikishima Canvas Ltd.), 15 is a substitute ring for canvas roll, which is shown in detail in FIG. 6, 16 is a spring balance for measuring the external pressure, 17 is a turnbuckle for setting the external pressure, 18 is a heater for heating the fluororesin coated roll 14.

It was found that the wear-resistant properties of the fluororesin against the rubbing motion of canvas is enhanced by the addition of carbon or carbon fiber as a filler. Further studies with other fillers, i.e., carbon mixed with graphite, graphite itself, carbon mixed with molybdenum disulfide, led to similar discoveries.

Suitable quantities for additional fillers are 1 to 40%, preferably 5 to 30%, by volume to the volume of fluororesin used. Fillers which can be applied to electrostatic painting or fluid soaking can be added to the fluororesin. A canvas roll, the surface of which is coated with the fluororesin containing a suitable amount of the above fillers, may last consid- Further, it is possible to use if every metals or alloys has moderate hardness and non-contaminant property as mentioned above, which can be used for coating on the both ends of the canvas roll, but especially, it is desirable to use one of the following metals, i.e., chromium plating, non-electrolytic nickel plating, tungsten carbide, chromium carbide, and nickel-chromium alloy etc.

It is possible to provide the metal layers with polished surfaces. However, it is more desirable to provide them with rough surfaces to prevent slippage of the canvas belt.

The reason why it is not necessary to care for non-contaminant property at the ends of the canvas roll is that there are no crevices between the canvas belt and the canvas roll for alien substances, such as pitch contaminates, to enter because of the high tension of the canvas caused by the unsymmetrical pressing, and there is an effect to remove the contaminants physically as soon as they have been attached.

EMBODIMENT

The canvas roll is of steel pipe (L 4,140 mm×ϕ280 mm) plated by chromium, and was fired after being painted with primer after a groove is formed in the middle part that is lower than 0.2 mm around the sections, 1,040 mm from the ends of the roll. The middle part is the painted electrostatically with PFA resin containing 10% capacity of carbon fiber in 0.3 mm thick as a target. The roll was then fired for one hour at 380° C. The roll which has a uniform, coplanar outer surface that has surface in order of the chromium plating at one end, fluororesin in the middle and chromium plating at the other end. The fluororesin surface is polished to form the uniform surface. The roll abuts the canvas that touches directly the wet paper and is driven by the dryer part of the paper making machine at a speed of 800 m/min.

The fluororesin near the ends of the canvas roll was worn to make the steel pipe to expose and to occur pitch contaminant. At the same time, the attaching and burying of solidified pitch over remaining fluororesin after the prior canvas roll coated by the fluororesin was operated for 6 months. It was not sign to find the attaching pitch and wearing after using the canvas roll of this invention for one year.

Moreover, the roll of this invention prevents the production of static electricity and sparking discharge, because the middle part of the roll is covered by the fluororesin containing conductive carbon fiber.

Thus, the canvas roll of this invention, in which the both ends of the roll are covered with a metal alloy coat 2 with spaced apart outer end sections that overlie the main body of the roll 1 with wear-resistant and non-contaminant properties and the middle part is covered with fluororesin containing wear-resistant fillers with conductive property and lubricity such as carbon and carbon fiber, can be used for a long period of time. The roll also prevents static electricity from developing by which the filler itself has a conductive character and the rate of voluminal resistance of the fluororesin can be lowered indirectly.

It should be mentioned here that the roll of this invention can be used not only for the paper making machine as a canvas roll, but also for the plastic film-making and plastic sheet-making machines, and it is extraordinarily useful when the edges of the plastic sheet or film makes the surface of the roll covered with fluororesin wear unusually.

The roll with composite coats of this invention is coated with harder material than the raw material at the both ends and coated with plastic at the middle part so as to have a uniformly concentric outer surface. If, however, both ends of the canvas roll of the paper making machine have a proper hardness and non-contaminant property and the finding which the pitch contaminant did not occur was used positively, the plastic with a good mold releasing property as to the fluororesin was not necessary to use, but the wear-resistant property can be raised on the both ends.

On the other hand, the pitch problems can be minimized by using the plastic with a good mold releasing property as to the fluororesin having the wear resistant property at the middle part other than the both ends of the paper making machine.

There was one result which can give full play to the excellent wear resistant property and non-contaminant property by the roll, in special, the roll of the paper making machine was covered by the any one of the chromium plating, non-electrolytic nickel plating by plating method, or cermet and alloy by thermal spray method.

Further, there is also a result which prevents the production of static electricity and improves wear resistant properties notably against the rubbing motion with the canvas by which the fluororesin used as the plastic covering over the part other than the both ends of the roll was attached by any one of the following fillers, i.e., carbon, carbon fiber, carbon plus graphite, carbon fiber plus graphite, carbon plus molybdenum disulfide, and carbon fiber plus molybdenum disulfide.

What is claimed is:

1. A roll for tensioning a belt employed in a paper handling assembly, said roll comprising:

a main body formed of steel and having a cylindrically shaped outer surface that has opposed ends;

a metal layer disposed over said outer surface of said main body, said metal layer being harder than said steel forming said main body, said metal layer being shaped to define spaced apart end sections each of which overlies a separate one of said opposed ends of said outer surface of said main body, wherein said end sections of said metal layer have a common, constant diameter and each said end section of said metal layer has an axial length, and a circumferential channel defined by said metal layer between said end sections of said metal layer wherein said circumferential channel has a cylindrical outer surface with a diameter less than said common diameter of said end sections of said metal layer and wherein said circumferential channel has an axial length greater than said axial length of either said end sections of said metal layer; and a fluororesin layer disposed in said circumferential channel defined by said metal layer, said fluororesin layer having a constant diameter outer surface that has a diameter equal to said common diameter of said end sections of said metal layer and wherein said fluororesin layer has an axial length greater than said axial length of one of said end sections of said metal layer.

2. The roll of claim 1, wherein said metal layer is formed from a metal selected from the group consisting of chromium, chromium carbide, cermet, alloy and nickel.

3. The roll of claim 1, wherein said fluororesin layer contains a filler wherein said filler is selected from a group consisting of: carbon; carbon fibers; carbon and graphite mix; carbon fiber and graphite mix; carbon and molybdenum disulfide mix; and carbon fiber and molybdenum disulfide mix.

4. The roll of claim 1, wherein said metal layer is shaped so that said circumferential channel defined by said metal layer has an outer surface with a diameter approximately 0.4 mm less than the common diameter of said end sections of said metal layer.

5. The roll of claim 1, wherein said main body has a total length and wherein, a first one of said end sections of said metal layer extends along approximately one-quarter the total length of said main body from a first opposed end of said main body a second one of said end sections of said metal layer extends along approximately one-quarter the total length of said main body from a second opposed end of said main body and wherein said fluororesin layer extends approximately one-half the total length of said main body between said end sections of said metal layer.

6. The roll of claim 5, wherein said metal layer is shaped so that said circumferential channel defined by said metal layer has an outer surface with a diameter approximately 0.4 mm less than the common diameter of said end sections of said metal layer.

7. The roll of claim 1, wherein said metal layer is shaped to have opposed, outwardly tapered edge surfaces that extend from said circumferential channel defined by said metal layer to said end sections of said metal layer and wherein said fluororesin layer covers said tapered edge surfaces of said metal layer so as to have complementary outwardly tapered edge surfaces that extend from said circumferential channel to said end sections of said metal layer.

8. A paper handling assembly for holding paper against a processing unit, said assembly including:

a closed loop canvas belt disposed adjacent the processing unit having a surface thereof adapted to hold the paper against the processing unit; and at least one metallic roll positioned against said canvas belt so as to urge said canvas belt against said processing unit so that the paper is compressed between said canvas belt and said processing unit, said metallic roll including:

a main body formed of steel and having a cylindrically shaped outer surface that has opposed ends;

a metal layer disposed over aid outer surface of said main body, said metal layer being harder than said steel forming said main body, said metal layer being shaped to define spaced apart end sections each of which overlies a separate one of said opposed ends of said outer surface of said main body, wherein said end sections of said metal layer have a common, constant diameter and each said end section has an axial length, and a circumferential channel defined by said metal layer between said end sections of said metal layer wherein said circumferential channel has a cylindrical outer surface with a diameter less than said common diameter of said end sections of said metal layer and wherein said circumferential channel has an axial length greater than said axial length of either said end sections of said metal layer; and a fluororesin layer disposed in said circumferential channel defined by said metal layer, said fluororesin layer having a constant diameter outer surface that has a diameter equal to said common diameter of said end sections of said metal layer and wherein said fluororesin layer has an axial length greater than said axial length of one of said end sections of said metal layer.

9. The paper handling assembly of claim 8, wherein:

said main body of said at least one metallic roll has a total length and wherein, a first one of said end sections of said metal layer of said at least one metallic roll extends along approximately one-quarter the total length of said main body from a first opposed end of said main body, a second one of said end sections of said metal layer of said at least one metallic roll extends along approximately one-quarter the total length of said main body from a second opposed end of said main body wherein and said fluororesin layer of said at least one metallic roll layer extends approximately one-half the total length of said main body between said end sections of said metal layer of said at least one metallic roll.

10. The paper handling assembly of claim 8, wherein said metal layer of said at least one metallic roll is formed from a metal selected from the group consisting of chromium, chromium carbide, cermet, alloy and nickel.

11. The paper handling assembly of claim 8, wherein said fluororesin layer of said at least one metallic roll contains a filler wherein said filer is selected from a group consisting of: carbon; carbon fibers; carbon and graphite mix; carbon fiber and graphite mix; carbon and molybdenum disulfide mix; and carbon fiber and molybdenum disulfide mix.

12. The paper handling assembly of claim 8, wherein said at least one metallic roll is positioned to abut against said surface of said canvas belt that contacts the paper.

13. The paper handling assembly of claim 12, wherein said canvas belt is formed of cotton.

14. The paper handling assembly of claim 12, wherein said canvas belt is formed from one of a group consisting of polyamides, polyesters and polyacrylates.

15. The paper handling assembly of claim 14, wherein said main body of said at least one metallic roll has a total length, and wherein a first one of said end sections of said metal layer of said at least one metallic roll extends along approximately one-quarter the total length of said main body from a first opposed end of said main body, a second one of said end sections of said metal layer of said at least one metallic roll extends along approximately one-quarter the total length of said main body from a second opposed end of said main body and wherein said fluororesin layer of said at least one metallic roll extends approximately one-half the total length of said metal layer roll main body between said end sections of said metal layer of said at least one metallic roll.

16. The paper handling assembly of claim 14, wherein said metal layer of said at least one metallic roll is shaped so that said circumferential channel defined by said metal layer has an outer surface with a diameter approximately 0.4 mm less than the common diameter of said end sections of said metal layer of said at least one metallic roll.

17. The paper handling assembly of claim 8, wherein said metal layer of said at least one metallic roll is shaped to have opposed outwardly tapered edge surfaces that extend from said circumferential channel defined by said metal layer of said at least one metallic roll to said end sections of said metal layer of said at least one metallic roll and wherein said fluororesin layer of said at least one metallic roll covers said tapered edge surfaces of said end sections of said metal layer so as to have complementary outwardly upwardly tapered edge surfaces that extend from said circumferential channel defined by said metal layer of said at least one metallic roll to said end sections of said metal layer of said at least one metallic roll.

18. A roll for tensioning a belt employed in a paper handling assembly to impose a tension on the paper being processed, said roll including:

a main body formed of steel having a hardness, said main body shaped to have concentric opposed ends cylindrical outer surfaces of said opposed ends have an identical diameter and a circumferential channel located between said opposed ends, said circumferential channel of said main body being concentric with said opposed ends of said main body and wherein said circumferential channel has a diameter less than said identical diameter of said opposed ends of said main body;

a metal coating having a hardness greater than the hardness of the steel forming said main body disposed wherein said metal coating is entirely over said main body wherein said metal coating disposed over said opposed ends of said main body form roll end outer surfaces that have a common, constant diameter and wherein said metal coating disposed over said circumferential channel of said main body forms a circumferential channel between said roll end outer surfaces wherein said circumferential channel formed by said metal coating has an outer surface with a diameter less than said common diameter of said roll end outer surfaces; and a fluororesin layer disposed in said circumferential channel formed by said metal coating, said fluororesin layer having a constant diameter surface that has a diameter equal to said common diameter of said roll end outer surfaces formed by said metal coating.

19. The roll of claim 18, wherein said main body is further shaped to have opposed outwardly tapered edge surfaces that extend from said circumferential channel of said main body to said opposed ends of said main body, wherein said metal coating forms outwardly tapered edge surfaces that overlie said outwardly tapered edge surfaces of said main body and wherein said fluororesin layer covers the outwardly tapered edge surfaces of the metal coating so as to have complementary outwardly tapered edge surfaces that extend from said circumferential channel formed by the metal coating to said roll end outer surfaces fromed by the metal coating.

20. The roll of claim 19, wherein said metal layer is formed from a metal selected from the group consisting of chromium, chromium carbide, cermet, alloy and nickel.

21. The roll of claim 19, wherein said fluororesin layer contains a filler wherein said filler is selected from a group consisting of: carbon; carbon fibers; carbon and graphite mix; carbon fiber and graphite mix; carbon and molybdenum disulfide mix; and carbon fiber and molybdenum disulfide mix.

* * * * *

UNITED STATES PATENT AND TRADEMARK OFFICE

CERTIFICATE OF CORRECTION

PATENT NO. : 5 564 196

DATED : October 15, 1996

INVENTOR(S) : Hirotoshi NOMURA et al

It is certified that error appears in the above-indentified patent and that said Letters Patent is hereby corrected as shown below:

Column 8, line 55; after "body" insert ---,---.

Column 9, line 20; change "aid" to ---said---.

lines 53 and 54; change "wherein and" to ---and wherein---.

line 64; change "filer" to ---filler---.

Column 10, line 20; delete "metal layer roll".

line 37; delete "upwardly".

line 56; delete "disposed".

line 57; after "is" insert ---disposed---.

Column 11, line 3; after "constant diameter" insert ---outer---.

Signed and Sealed this

Twenty-seventh Day of May, 1997

Attest:

Bruce Lehman

BRUCE LEHMAN

*Attesting Officer* *Commissioner of Patents and Trademarks*